(No Model.)

A. E. QUIDORT.
WHIFFLETREE.

No. 407,491. Patented July 23, 1889.

Witnesses
E. D. Smith
Alfred T. Gage

Inventor
Alfred E. Quidort
By his Attorney
W. F. Henderson.

UNITED STATES PATENT OFFICE.

ALFRED E. QUIDORT, OF MONTPELIER, OHIO.

WHIFFLETREE.

SPECIFICATION forming part of Letters Patent No. 407,491, dated July 23, 1889.

Application filed April 12, 1889. Serial No. 306,952. (No model.)

*To all whom it may concern:*

Be it known that I, ALFRED E. QUIDORT, a citizen of the United States, residing at Montpelier, in the county of Williams and State of Ohio, have invented certain new and useful Improvements in Neck-Yokes and Whiffletrees; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to neck-yokes, singletrees, and doubletrees which are made of tubular or hollow metal and braced or strengthened by a brace or truss rod. It is particularly well adapted to singletrees of the kind described, and has for its object to so construct and combine the parts that the truss or brace rod will be kept in place to the rear of the singletree, so that it will always serve its function of bracing the tree and preventing it from bending. It also has for its object to construct the parts so that there will be the minimum of projection, if any, beyond the point of attachment of the tugs, and thereby lessen the liability of damage or injury to plants or trees by the projecting ends of the singletree striking them.

To the accomplishment of the above and such other objects as may appear, the invention will now be described and then claimed, reference being had to the accompanying drawings, forming a part hereof, in which—

Figure 1:
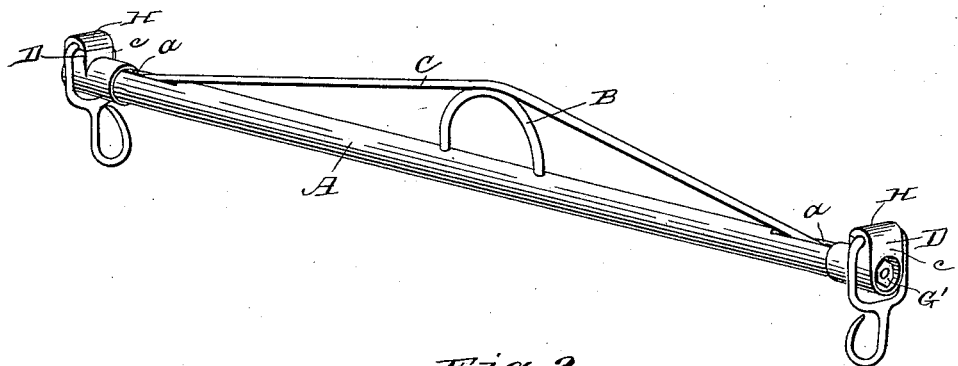
Figure 2:
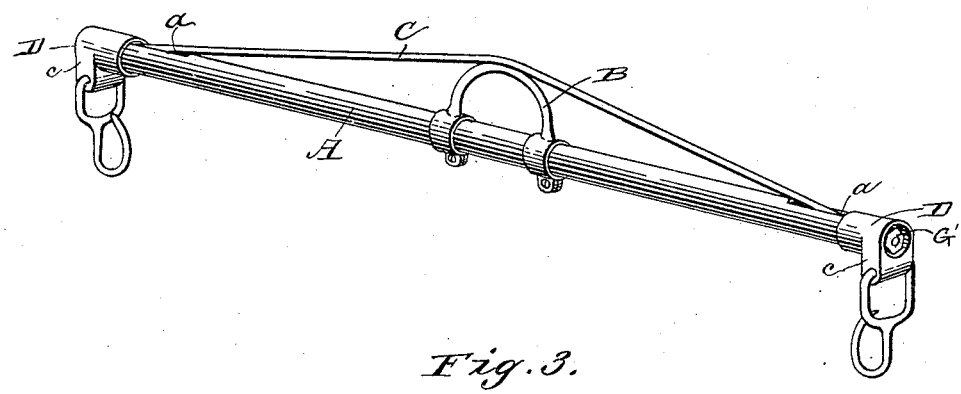
Figure 3:
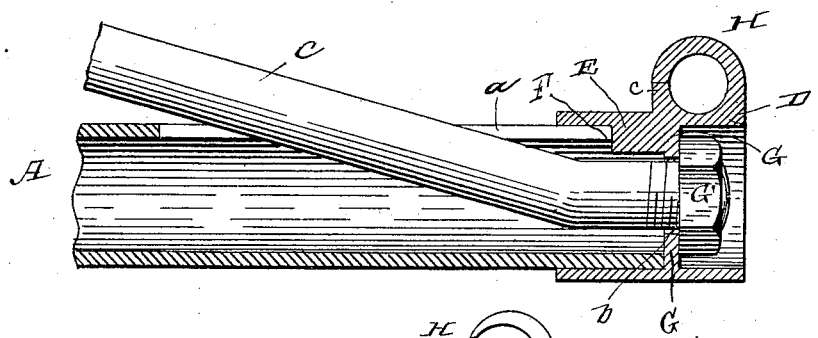
Figure 4:
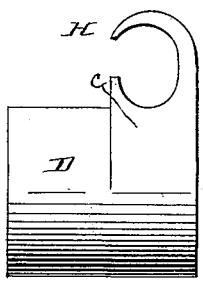

Figure 1 represents a perspective of a singletree with my invention applied thereto; Fig. 2, a similar view with the ferrule the reverse to what it is in Fig. 1. Fig. 3 is a section through a part of the singletree. Fig. 4 is a view of the ferrule detached from the main bar.

The drawings illustrate the bar of the singletree made of a tubular form—say from gas-pipe; but it may be made of any other form in cross-section—say, for instance, such as is illustrated in the patent granted to Stoner and Welch, September 27, 1887, No. 370,662, or other suitable form to which it can be applied.

In the drawings, the letter A designates the main bar provided with the bridge B and truss or brace rod C, the ends of which are passed through openings $a$, made in the main bar, and then out through the ends thereof. The brace or truss rod is held to its place by the ferrules or thimbles D, applied to the ends of the main bar and having the ends of the truss secured thereto. These thimbles or ferrules in cross-section will conform to the shape of the main bar, and are formed on their interior with a lug or key E, adapted to fit within a socket or seat F, formed in the main bar. It is obvious that the key might be formed on the main bar and the seat in the ferrule. The ferrule or thimble is divided interiorly by a transverse partition G, which is formed with an aperture $b$ for the passage of the end of the truss or brace rod, and it is set far enough back from the outer end of the ferrule to permit the application of a nut G' to the threaded end of the truss as to bring the nut wholly within the ferrule or thimble. When the nut is applied, the truss can be tightened and the thimble prevented from moving endwise, while at the same time the key and seat will prevent the thimble from turning.

The ferrule or thimble is formed on its rear with a hook H, which opens inwardly, and is designed to receive the eye or ring of the tug. The outside face of this hook preferably lies flush or parallel with the outer face or end of the ferrule, so that when the trace is hooked to it there will be no sufficient projection to strike and injure plants or trees. It will also be observed that there is a shoulder or offset $c$ between the hook and the forward part of the ferrule at the top and bottom faces thereof, which give an oblong instead of a circular shape in cross-section to the ferrule at the point where the eye or ring of the trace lies. This tends to prevent the bar from turning when an obstruction is struck. If it were to turn, and especially when the strain was on it, the truss or brace rod would be carried from the position where it would serve to resist the strain, and as a consequence the singletree would bend and be injured. Such an objection was found to exist in singletrees of this character as heretofore constructed, and with the view to overcome that objection this invention was devised. The construction of ferrule which I have herein described also guards against the trace when slack becoming twisted around the singletree-bar, which, if allowed when the strain is heavy, would tend to bend the tree.

The several improvements which I have described free the singletrees of the defects found to exist under prior constructions and make such a tree or neck-yoke a practical success.

The hook H may be closed, as shown in Figs. 1, 2, and 3, or it may be open, as shown in Fig. 4, and the ferrule may be used as shown in Fig. 1, or as shown in Fig. 2.

The whiffletree will be provided at its center with a link twisted to bring its two parts at such an angle to each other as will allow the whiffletree suitable play. Such is not shown because not specifically claimed herein.

It will be understood that the invention is applicable to doubletrees and to neck-yokes as well as to singletrees, and so will not be confined to singletrees. It will also be understood that the ferrule to the end of the doubletree may be cast solid, so as to permit the use of a clevis-pin instead of a hook, as for the singletree. It is not considered necessary to illustrate such form, but only to refer to it, as it is not specifically claimed herein.

Having described my invention and set forth its merits, what I claim is—

1. The combination, with the main bar and truss, of the ferrule formed with an interior partition, through which the truss passes, and means applied to the end of the rod inside the ferrule to hold it and the ferrule in place, substantially as and for the purposes described.

2. The combination, with the main bar and truss, of the thimble or ferrule provided with an interior perforated partition, a key to prevent the thimble from turning on the main bar, and a hook to receive the ring or eye of a tug, substantially as and for the purposes set forth.

3. The combination, with the main bar and truss, of a ferrule or thimble for holding the parts together, formed with a hook on its rear face and made oblong in cross-section where the ring or eye of a tug will lie, substantially as and for the purposes set forth.

4. The ferrule or thimble, for the purposes specified, formed with an interior perforated partition, a hook on its rear face, and means for preventing it from turning, substantially as described.

In testimony whereof I affix my signature in presence of two witnesses.

ALFRED E. QUIDORT.

Witnesses:
GEORGE STRAYER,
GEO. YESBERA.